Dec. 30, 1947.    E. C. BIERCE    2,433,591
APPARATUS FOR SMELTING SULPHUR
Filed Nov. 4, 1944
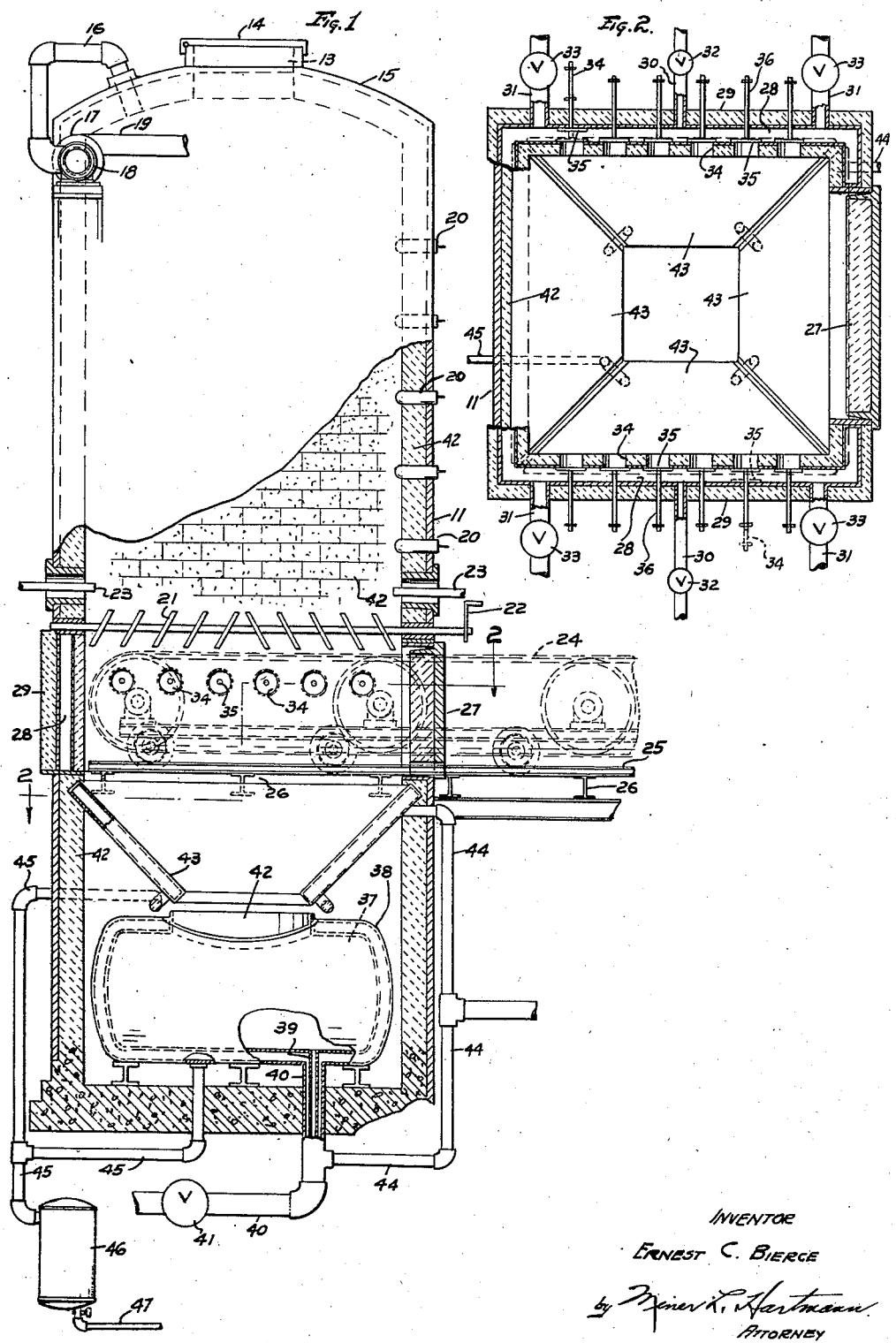
INVENTOR
ERNEST C. BIERCE
by Miner L. Hartmann
ATTORNEY Patented Dec. 30, 1947

2,433,591

UNITED STATES PATENT OFFICE 2,433,591

APPARATUS FOR SMELTING SULPHUR

Ernest C. Bierce, Pasadena, Calif.

Application November 4, 1944, Serial No. 561,969

6 Claims. (Cl. 23—280)

This invention relates to a process for recovery of sulfur from ores containing free sulfur, and to a smelter arrangement for carrying out the process.

An object of the invention is to provide a method for economically recovering sulfur from sulfur-containing ore. Another object is to provide a smelter arrangement for thermally extracting free sulfur from ore. Still another object is to provide a method and apparatus for recovering free sulfur and the oxides of sulfur formed in the smelting of ore containing free sulfur.

These and other objects are attained by my invention, which will be understood from the following description, reference being made to the accompanying drawing which forms a part hereof, in which Fig. 1 is a side elevational view, partly in section, showing a furnace arrangement of my invention; and Fig. 2 is a cross-sectional view taken on the line 2—2 of Fig. 1.

Referring to the drawing, my smelter arrangement consists of a shaft type furnace having a combustion and melting zone, a tuyère and refuse discharge zone below the first named zone, and a molten sulfur collecting means at the bottom. The furnace is constructed conveniently of a rectangular steel shell 11 which is substantially gas tight, lined with brick 12 which are preferably of good heat insulating quality. A charging opening 13 closed by a gas tight door 14 is provided in the arched roof 15 of the furnace, and a gas outlet pipe 16 is also provided in the roof, or near the top, this pipe being connected with a suction fan or blower 17 having a variable speed motor 18, the discharge from the blower being carried by the pipe 19 to a sulfur oxide recover plant, not shown. Protruding thermocouple tubes 20 are set in the brick lining 12 at various positions and elevations for determining the temperatures at different locations in the combustion and melting zone. Grate bars 21 support the porous charge of ore at the bottom of the combustion and melting zone, and these are adapted to be turned, for example by the crank 22, for removal at times of exhausted ore. Pilot burners 23 adapted to initiate the combustion of some of the sulfur in the ore, are set above the grate bars at several positions around the furnace, a mixture of air and natural gas, or air and oil, or the like, being provided for burning in these pilot burners during the initial operating cycle.

The tuyère and refuse discharge zone is disposed beneath the grate bars and above the molten sulfur collecting zone. For removing the exhausted ore from the combustion and melting zone, when discharged through the grate bars 21, a portable pan conveyor 24 may at times be moved on the tracks 25 supported on the I-beams 26 through the movable door 27 into the furnace beneath the grate 21 in the tuyère and refuse removal zone.

Air manifolds 28 are provided on two sides of the furnace at the tuyère and refuse removal zone, these being conveniently made of welded steel plate, provided with heat insulation 29 on the outside. Valved pipes 30 and 31 are connected to each manifold, the pipes 30 being open for atmospheric air through the valves 32, and the pipes 31 being connected to a source of heated air through the valve 33. Multiple parts 34 are arranged from the manifolds 28 into the tuyère zone of the furnace interior below the grates 21, each being provided with a gate or plug 35 attached to a rod 36 extending through the manifold wall and insulation 29, so that the amount of air admitted to the furnace at each port position may be readily regulated from outside the manifold by the protruding rods 36. By regulating the valves 32 and 33, the temperature of the air going into the ports 34 may be controlled.

The molten sulfur collecting zone is disposed below the tuyère zone, at the base of the furnace. It consists, within the outer steel and brick shell of the furnace previously described, of a collecting tank 37 provided with an outer jacket 38 for steam (or equivalent) heating, and an outlet pipe 39 with steam jacket 40, and a valve 41, through which the molten sulfur which collects may be run out into casting forms or to other storage vessels. The tank 37 has a relatively large opening 42 at the top for receiving the molten sulfur, the liquid being collected below the tuyère zone on downward sloping funnel members 43, which guide the flow of molten sulfur into the tank 37. The funnel members 43 are set close to the side walls at their upper ends and are fitted together at the corners to avoid loss of molten sulfur. They are preferably steam heated so that solid sulfur does not build up on them, the steam feed line 44 to the funnel members, to the tank jacket, and to the outlet pipe jacket leading to a source of steam (not shown), with a return line 45 leading to the steam trap 46, with a condensed water return line shown as 47.

Since for economical production the heat must be conserved, the furnace walls are sufficiently insulated to avoid undue heat losses. The size of the furnace, as well as its proportions, may be varied as desired. The metal used in contact with the molten sulfur and sulfur vapors and gases is preferably of aluminum, or aluminum coated, but other sulfur resistant metals may also be used.

The process of recovering sulfur from ores containing free sulfur consists generally of forming a porous mass of ore crushed to smelter sizes within a gas tight container, igniting the sulfur, and then drawing through the porous mass only enough air, either cold or heated, to furnish the oxygen to burn a minor portion of the contained sulfur in the mass, thereby generating sufficient heat to melt out the balance of the sulfur, and collecting the molten sulfur, and also the sulfur oxides as gases from the combustion reaction. The process will be illustrated by reference to the apparatus above described, in which the process may be advantageously carried out, but it will be clear that furnaces of other types and other details of construction may also be used in carrying out my process.

The sulfur ore is first crushed to "smelter sizes," that is, an assortment of sizes from a maximum of about 4 inch cubes or equivalent volume, with preferably no large proportion of fines. Smaller maximum sizes may be used depending upon the nature of the ore. I have successfully operated my process using "tuff" ore crushed to 2 inches and finer. The ore, crushed to smelter sizes is charged into the furnace through the charging manhole 13 at the top of the furnace and rests upon the grate bars 21 in the furnace described. Care must be taken to evenly distribute the various sized ore pieces so that the porosity of the mass will be uniform, since otherwise channeling will occur, and some of the sulfur will escape the extraction or will require longer heating time. After charging the furnace, the manhole cover 14 is put in place and the suction blower 17 is started. The sulfur is ignited by means of the pilot burners 23, or the burning may be initiated by burning firewood or other inflammable material beneath the grate. The sulfur should be ignited at enough different points to get uniform burning through the mass. The heat of the burning sulfur soon starts to melt out the sulfur from the adjacent ore, and it flows down through the grate bars and collects on the steam heated funnel members 43 and flows into the steam jacketed tank 37. The amount of air allowed to come into the furnace through the ports 34 is controlled by the combination of a variable speed motor 18 operating the suction blower 17, and by the opening of the several ports 34 leading into the furnace from the manifold 28. Only enough air is admitted to burn a minor portion of the sulfur contained in the ore, that is, only enough to efficiently melt out the unburned sulfur. By means of the thermocouples or thermometers inserted at various parts of the combustion zone, the amount of oxygen (air) may be controlled to give the best operating temperatures as the zone of combustion of sulfur moves up in the ore mass. The temperature of the air used for combustion may be controlled by mixing atmospheric air with preheated air in the manifolds 28 around the tuyère zone of the furnace. It may be necessary to use heated combustion air in the later stages of the operation when the exhausted ore in the lower part of the combustion zone may become cool enough to solidify the molten sulfur running down from the higher elevations in the ore mass, in which case a greater proportion of pre-heated air is put into the manifolds.

When the sulfur has been substantially completely melted out of the ore mass, the blower 17 is shut down, the refuse conveyor 24 is run into the furnace under the grates, the grate bars are turned by the crank 22, and the exhausted ore is discharged onto the conveyor and out to the waste dump. Then the furnace is re-charged and the cycle repeated. The molten sulfur in the tank 37 may be run out and cast into pigs or blocks of brimstone. The blower discharge mixture of sulfur oxides and air residue, mostly nitrogen, is treated in a suitable absorption plant to recover the sulfur oxides for liquifaction or chemical conversion to other compounds, for example, sulfuric acid.

Ordinarily the process would be so operated that the minimum amount of sulfur would be burned to furnish the necessary heat to melt the remainder, but there may be occasions when the oxides of sulfur are wanted in larger proportions than is obtained when the furnace is operated for optimum recovery of elementary sulfur. In this case more air is admitted, more sulfur is burned, and more oxides are formed for extraction after separation from the associated air residue gases.

Using my process in a smelter arrangement as described herein, and operating for maximum recovery of brimstone, I have found that from 75 to 95 percent of the contained sulfur may be recovered as brimstone. The refuse contains less than five-tenths percent of free sulfur. The lower the grade of ore, the higher percentage of the sulfur must be burned to melt out the brimstone. For example, using an ore containing about 60 percent sulfur, the recovery in the form of brimstone was about 95 percent and as oxides of sulfur about 4.2 percent. With an ore containing about 40 percent sulfur, the brimstone recovered was about 90 percent and the sulfur as oxides was about 8.7 percent. With low grade ore running about 20 percent sulfur, the brimstone was about 75 percent and as oxides of sulfur about 22.5 percent.

The smelter herein described is intended for batch operation, but by tilting the structure so that the molten sulfur will flow down one side, the operation may be made continuous, the charging being continuous, and the removal of refuse being continuous on the pan conveyor, through sealing doors and vestibules to prevent the leakage of too much air through the door openings.

The advantages of my process are that by controlled oxidation the recovery of sulfur is more economical than by other known methods of extracting sulfur from ore. The apparatus for carrying out my process is simple and inexpensive to build and operate. The sulfur furnishes its own fuel.

While I have described one form of furnace structure for carrying out my process, and have illustrated the process specifically by referring to the preferred form of furnace shown and described, I do not wish to be limited to the details given here for illustration, but restrict my invention only insofar as required by the state of the art and the spirit of the appended claims.

I claim:

1. In a shaft type sulfur smelter having a combustion and melting zone, a tuyère zone having a manifold and individually valved multiple ports into said combustion and melting zone for the regulated introduction of combustion air during operation, a funnelled collecting zone beneath said tuyère zone adapted to collect the molten sulfur falling through said tuyère zone, and a suction blower adapted to draw in a controlled amount of combustion air through said manifold and valved ports up through the ore in said combustion and melting zone.

2. In a shaft type sulfur smelter having a combustion and melting zone; a tuyère zone having a heated air manifold and individually valved port means into said combustion and melting zone for the regulated introduction of heated combustion air into said combustion and melting zone; a heated funnelled molten sulfur collecting zone beneath said tuyère zone adapted to collect the molten sulfur falling through said tuyère zone; and a suction blower adapted to draw in a controlled amount of combustion air through said manifold and valved ports up through the ore in said combustion and melting zone.

3. A sulfur smelter comprising a shaft furnace consisting of a gas tight heat insulated shell, a discharging grate disposed at an intermediate elevation, a gas discharge pipe near the top of the furnace, an ore-charging door near the top of the furnace, manifold connected valved ports disposed on opposite sides of the said furnace below and adjacent said grate, removable horizontal conveyor means adapted to at times be inserted in and removed from said shell beneath said grate, a molten sulfur collecting means disposed beneath said grate; and suction means attached to the said discharge pipe adapted to draw in combustion air through said manifold and said ports, and after combustion to draw the combustion gases through the ore in said shaft furnace.

4. A sulfur smelter comprising a shaft furnace consisting of a gas tight heat insulated shell, a discharging grate disposed at an intermediate elevation, a gas discharge pipe near the top of the furnace, an ore-charging door near the top of the furnace, manifold connected valved ports disposed on opposite sides of the said furnace below and adjacent said grate, removable horizontal conveyor means adapted to at times be inserted in and removed from said shell beneath said grate; a molten sulfur collecting means disposed beneath said grate consisting of heated funnelling plates extending inwardly from the walls near the bottom of said furnace, a heated receiver for molten sulfur; and suction means attached to the said discharge pipe adapted to draw in a controlled amount of combustion air through said manifold and said ports, and after combustion to draw out the combustion gases through the ore in said shaft furnace.

5. A sulfur smelter comprising a shaft furnace consisting of a gas tight heat insulated shell, a discharging grate disposed at an intermediate elevation, a gas discharge pipe near the top of the furnace, an ore charging door near the top of the furnace, manifold connected valved ports disposed on opposite sides of the said furnace below and adjacent said grate, removable horizontol conveyor means adapted to at times be inserted in and removed from said shell beneath said grate; a molten sulfur collecting means disposed beneath said grate consisting of heated funnelling plates extending inwardly from the walls near the bottom of said furnace a heated receiver for molten sulfur; a variable speed suction means attached to the said discharge pipe adapted to draw in a controlled amount of combustion air through said manifold and said ports, and after combustion to draw out the combustion gases through the ore in said shaft furnace.

6. A sulfur smelter comprising a shaft furnace consisting of a gas tight heat insulated shell, a discharging grate disposed at an intermediate elevation, a gas discharge pipe near the top of the furnace, an ore-charging door near the top of the furnace, manifold connected valved ports disposed on opposite sides of the said furnace below and adjacent said grate, burner means adapted to introduce combustible material other than sulfur above said grate, removable horizontal conveyor means adapted to at times be inserted in and removed from said shell beneath said grate, a molten sulfur collecting means disposed beneath said grate; and suction means attached to the said discharge pipe adapted to draw in combustion air through said manifold and said ports, and after combustion to draw the combustion gases through the ore in said shaft furnace.

ERNEST C. BIERCE.

REFERENCES CITED

The following references are of record in the file of this patent:

Lunge, "Sulfuric Acid and Alkali," vol. I, part I, pages 29 and 30. Published by Gurney & Jackson, London (1913).

Mellor, "Inorganic and Theoretical Chemistry," vol. 10, pages 14 and 15. Published by Longmans, Green and Co., London (1930).

Thorpe, "Dictionary of Applied Chemistry," vol. 5, page 287 (1916 edition). Published by Longmans, Green and Co., London.